United States Patent
Bartkowiak et al.

(10) Patent No.: US 6,641,870 B2
(45) Date of Patent: Nov. 4, 2003

(54) INK, PAINT, POLLUTANT, BIOORGANISM, OIL, WATER AND/OR DIRT REPELLENT COATING

(75) Inventors: Bernd Bartkowiak, Wehr (DE); Burkhard Standke, Loerrach (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/963,534

(22) Filed: Sep. 27, 2001

(65) Prior Publication Data

US 2002/0037370 A1 Mar. 28, 2002

(30) Foreign Application Priority Data

Sep. 27, 2000 (DE) .......................................... 100 49 153

(51) Int. Cl.$^7$ .............................. B05D 1/36; B05D 7/00; C08G 77/26
(52) U.S. Cl. .................... 427/407.1; 427/421; 427/428; 427/429; 427/430.1; 428/447; 106/287.11; 106/287.12; 106/287.13; 528/38
(58) Field of Search ............................... 427/407.1, 421, 427/428, 429, 430.1; 428/447; 106/287.11, 287.13, 287.12; 528/38

(56) References Cited

U.S. PATENT DOCUMENTS 5,702,509 A * 12/1997 Pellerite et al. ................. 106/2
5,783,622 A * 7/1998 Sabata et al. ................ 524/444

FOREIGN PATENT DOCUMENTS

DE 19955047 * 6/2001

* cited by examiner

Primary Examiner—Shrive P. Beck
Assistant Examiner—Elena Tsoy
(74) Attorney, Agent, or Firm—Oblon, Spivak, McClelland, Maier & Neustadt, P.C.

(57) ABSTRACT

A process for producing a coating on a substrate, which includes:

(A) applying to a substrate in a first step a composition which includes one or more organosilicon components defined in the claims, to obtain a treated substrate, and (B) subsequently in a second step applying (i) at least one organosiloxane which carries at least one triamino group of the general formula $\{NH_x(CH_2)_a NH_y(CH_2)_b NH_2\}$— or a composition which includes (i), to the treated substrate.

15 Claims, No Drawings

INK, PAINT, POLLUTANT, BIOORGANISM, OIL, WATER AND/OR DIRT REPELLENT COATING

BACKGROUND OF THE INVENTION

1. Field of the Invention

The present invention relates to an ink, paint, pollutant, bioorganism, oil, water and/or dirt repellent coating on an absorbent inorganic substrate and to a process for producing such a coating, including substrates thus coated.

2. Discussion of the Background

The preparation of alkylalkoxysilanes and also fluoroalkylalkoxysilanes or corresponding polycondensates has long been known, as has their use substantially as hydrophobicizing and oleophobicizing agents (DE-A 15 18 531, EP 0 101 816 B1, EP 0 587 667 B1, EP 0 716 127 A2, EP 0 716 128 A2 and DE-A 195 44 763).

In order to obtain sufficiently stable solutions and formulations of alkyl-functional and/or fluoroalkylfunctional silanes, and of corresponding cocondensates, organic solvents or else emulsifiers have been used (DE C 27 51 714, EP 0 538 555 B1, EP 0 819 665 A1, WO 95/23830, EP 0 846 716 A1, EP 0 960 921 A1).

Nitrogen-containing or aminoalkyl-functional and fluoroalkyl-functional, and substantially alkoxy-free, organosiloxanes are known as water-soluble constituents in otherwise emulsifier- and surfactant-free compositions for producing surfaces which repel water, oil and dirt (EP 0 846 717 A1).

The German patent application 199 55 047.6 discloses a composition which comprises at least one triaminoalkyl and fluoroalkyl-functional, hydroxyl- and/or alkoxy-containing organosiloxane or a corresponding organosiloxane mixture, water, with or without an alcohol component and with or without an acid component, the composition being suitable for use in particular for hydrophobicizing and/or oleophobicizing surfaces, for anti-graffiti applications, i.e., with an ink and paint repelling action, and for easy to clean applications, i.e., with a dirt or bioorganism repelling activity.

Daubing on buildings, especially in larger cities, is an ever increasing problem worldwide. The cleaning of affected facades is very laborious and entails high costs. Accordingly, what are known as anti-graffiti protective coats are applied to regions of the facade that are at risk.

DE 199 55 047.6 reveals that water-based co-condensates of triamino-functional trialkoxysilanes and fluoroalkylsilanes are particularly suitable for graffiti protection. At the same time, however, these products are very expensive, since the starting materials used to prepare them carry high prices. Absorbent, i.e., porous mineral building materials, such as concrete, may require the use of fairly large amounts when impregnated with the substances described in DE 199 55 047.6, which in many cases may prove prohibitive—primarily for reasons of cost—to their use.

Concrete and other mineral building materials are at risk not only from graffiti daubing but also from penetrating water, which may carry pollutants, such as chlorides, into the porous structure and may, for example, damage the steel reinforcement of concrete. Because of their very low depth of penetration, the abovementioned fluoro-functional co-condensates of DE 199 55 047.6 afford hardly any protection against penetrating chlorides.

There is therefore a need for anti-graffiti coatings which necessitate the use of very small amounts of high-priced products while at the same time affording enhanced protection against water-transported pollutants.

It is an object of the invention to provide a further possibility for protecting inorganic substrates, and, in particular, for furnishing them with anti-graffiti properties.

SUMMARY OF THE INVENTION

According to one embodiment of the present invention is a method of producing a coating on a substrate by applying at least two coatings of an organosiloxane.

According to another embodiment of the present invention is a method of producing a coating on a substrate comprising applying at least two coatings of an organosiloxane in which a concentration of organosiloxane in a first coating step is less than a concentration of organosiloxane in a second coating step.

According to another embodiment of the present invention is a method of producing a coating on a substrate comprising applying an alkyl-functional alkyltrialkoxysilane followed by applying an organosiloxane.

These and other objects of the present invention have been made possible by first applying a highly diluted solution of an organosiloxane such as those described in DE 199 55 047.6, endowing the surface with a water repelling effect, and then appropriately applying one or more further coats of an organosiloxane such as those products described in DE 199 55 047.6. It has been surprisingly found that anti-graffiti coatings with reduced consumption of material may be prepared by such a method.

These and other objects of the present invention have also been made possible by first applying at least one alkyl-functional trialkoxysilane followed by treatment with an organosioxane. It has also surprisingly been found that the penetration of water and thus the penetration of water-dissolved pollutants into mineral substrates, in combination with an outstanding anti-graffiti effect, can be achieved by subjecting said substrates, prior to coating them one or more times with an organosiloxane such as the products described in DE 199 55 047.6, to treatment with at least one alkyl-functional alkyltrialkoxysilane.

In accordance with the process of the invention, it is possible advantageously to produce a permanent anti-graffiti coating with outstanding ink, paint, pollutant, bioorganism, oil, water, and dirt repelling properties.

The present invention accordingly provides a process for producing an ink, paint, pollutant, bioorganism, oil, water and/or dirt repellent coat on an inorganic substrate, which comprises:

A) applying to a substrate in a first step a composition comprising an organosiloxane selected from the group consisting of
(i) an organosiloxane which carries at least one tri-amino group of the general formula I

$$[NH_x(CH_2)_aNH_y(CH_2)_bNH_z]-\qquad (I),$$

such a group being attached by way of at least one N-bonded alkylene group having 1 to 4 carbon atoms to at least one silicon atom, a and b being identical or different and representing an integer from 1 to 6, x being 0 or 1 or 2, y being 0 or 1, z being 0 or 1 or 2, subject to the proviso that $(x+y+z) \leq 4$, at least one Si—C-bonded fluoroalkyl group of the general formula II

$$F_3C(CF_2)_r(CH_2)_s-\qquad (II)$$

in which r is an integer from 0 to 18 and s is 0 or 2, and at least one hydroxyl and/or alkoxy group,
(ii) a formulation which comprises an organosiloxane or a mixture of organosiloxanes as per (i),
(iii) an alkylalkoxysilane in which alkyl represents linear, branched or cyclic alkyl radicals having 1 to 16 carbon atoms and alkoxy represents methoxy or ethoxy or propoxy or butoxy,
(iv) a formulation which comprises at least one organosiloxane which carries at least one amino group of the general formula III $$[NH_2(CH_2)_a(NH)_r(CH_2)_b(NH)_s]—\quad\quad(III)$$

this group being attached by way of, at least one N-bonded alkylene group having 1 to 4 carbon atoms to at least one silicon atom, a and b being identical or different and being an integer from 0 to 6, r being 0 or 1, s being 0 or 1, subject to the proviso that when a=0 then r=0 and when b=0 then s=0, at least one Si—C-bonded linear, branched or cyclic alkyl group having 1 to 16 carbon atoms,
and at least one hydroxyl and/or alkoxy group; and
(v) a mixture thereof, and
(B) subsequently in a second step applying a further coat using an organosiloxane as per (i) or an organosiloxane-containing composition as per (ii) to the treated substrate.

The present invention accordingly provides a process for producing an ink, paint, pollutant, bioorganism, oil, water and/or dirt repellent coat on an inorganic substrate, which comprises:

A) applying to a substrate a composition comprising at least one alkyl-functional alkyltrialkoxysilane; and
B) applying to said substrate in a second step a composition comprising an organosiloxane selected from the group consisting of
(i) an organosiloxane which carries at least one triamino group of the general formula I $$[NH_x(CH_2)_aNH_y(CH_2)_bNH_z]—\quad\quad(I),$$

such a group being attached by way of at least one N-bonded alkylene group having 1 to 4 carbon atoms to at least one silicon atom, a and b being identical or different and representing an integer from 1 to 6, x being 0 or 1 or 2, y being 0 or 1, z being 0 or 1 or 2, subject to the proviso that (x+y+z)≦4, at least one Si—C-bonded fluoroalkyl group of the general formula II $$F_3C(CF_2)_r(CH_2)_s—\quad\quad(II)$$

in which r is an integer from 0 to 18 and s is 0 or 2, and at least one hydroxyl and/or alkoxy group,
(ii) a formulation which comprises an organosiloxane or a mixture of organosiloxanes as per (i),
(iii) an alkylalkoxysilane in which alkyl represents linear, branched or cyclic alkyl radicals having 1 to 16 carbon atoms and alkoxy represents methoxy or ethoxy or propoxy or butoxy,
(iv) a formulation which comprises at least one organosiloxane which carries at least one amino group of the general formula III $$[NH_2(CH_2)_a(NH)_r(CH_2)_b(NH)_s]—\quad\quad(III)$$

this group being attached by way of, at least one N-bonded alkylene group having 1 to 4 carbon atoms to at least one silicon atom, a and b being identical or different and being an integer from 0 to 6, r being 0 or 1, s being 0 or 1, subject to the proviso that when a=0 then r=0 and when b=0 then s=0, at least one Si—C-bonded linear, branched or cyclic alkyl group having 1 to 16 carbon atoms,
and at least one hydroxyl and/or alkoxy group; and
(v) a mixture thereof.

DETAILED DESCRIPTION OF THE PREFERRED EMBODIMENTS

In general, for the process of the invention, the components (i) to (iv) are preferably used in an impregnating composition having an active substance concentration of from 0.01 to 100 by weight, preferably from 0.01 to 95% by weight, with particular preference from 0.5 to 80% by weight, with very particular preference from 1 to 60% by weight.

The components (i) to (iv) may be in an aqueous and/or alcoholic formulation or in an emulsion. In this context, liquid or low-viscosity and creamlike or high-viscosity emulsions may be employed.

Appropriately, in the first step of the process of the invention the components (i) to (iv) are preferably used in dilute form in compositions having an active substance concentration of from 0.1 to 40% by weight, with particular preference from 0.5 to 10% by weight, with very particular preference from 1 to 5% by weight.

In a second or further step of the process of the invention, the components (i) or (ii) or a corresponding composition are or is advantageously used with an active substance concentration of from 1 to 50% by weight, preferably from 5 to 20% by weight.

In a preferred embodiment, the concentration of organosiloxane in the first coating step is less than the concentration of organosiloxane in the second coating step.

In another preferred embodiment, the amount of organosiloxane deposited as a result of the first and second coatings is ≦550 g/m², preferably ≦400 g/m², more preferably ≦300 g/m², even more preferably ≦200 g/m², even more preferably ≦150 g/m².

As a preferred component (iii) it is possible to use methyltrimethoxysilane, dimethyldimethoxysilane, methyltriethoxysilane, dimethyldiethoxysilane, i-propyltrimethoxysilane, i-propyltriethoxysilane, n-propyltrimethoxysilane, n-propyltriethoxysilane, i-butyltrimethoxysilane, i-butyltriethoxysilane, n-butyltrimethoxysilane, n-butyltriethoxysilane, i-octyltrimethoxysilane, i-octyltriethoxysilane, n-octyltrimethoxysilane, n-octyltriethoxysilane, hexadecyltrimethoxysilane or hexadecyltriethoxysilane and a mixture thereof Furthermore, preferred components as per (i) or (ii) comprise an organosiloxane and/or a mixture of organosiloxanes obtained by cocondensation of an aminoethylaminoethylaminopropyltrialkoxysilane and tridecafluorooctyltrialkoxysilane, alkoxy representing methoxy and representing ethoxy, cf. DE 199 55 047.6.

Particular preference in the case of the present process is given to an organosiloxane and/or a mixture of organosiloxanes in which the molar ratio of the groups of the formulae I and II is 1:≦3.5.

In the process of the invention, the components (i) to (iv) in accordance with step one, two or further steps may be applied to the substrate by spraying, brushing, rolling, dipping, knife coating, polishing or flow coating.

Preferably, in the second step or in further steps, the impregnating composition is applied by spraying, the spray droplets appropriately being made so small that they do not roll off from the hydrophobicized surface, even if the substrate is vertical, and the applied spray drops being dispersed uniformly so as to form a homogeneous liquid film on the surface. The dispersion of the impregnating composition applied in the second or further step may be performed mechanically, for example, by means of coarse or fine brush or similar equipment customary in the art.

The substrate treated in accordance with the process of the invention for the ink, paint, pollutant, bioorganism, oil, water and/or dirt repellency treatment is in particular a porous mineral building material.

Appropriately, said porous mineral building material, i.e., the substrate, comprises concrete, lime sandstone, brick, mineral plaster or natural stone, such as sandstone, marble, travertine or granite, for example.

Furthermore, the substrate may comprise a porous mineral building material coated with a paint system.

In general, the process of the invention is conducted by carrying out in the first step, inexpensively, an impregnation with a composition comprising alkyl functional and/or fluoroalkyl-functional silicon compounds. This is done by applying to the substrate a composition which, suitably, also penetrates fairly deeply into the porous substrate, and, if appropriate, reacts with, i.e., attaches to—the substrate. In general, the first coating is left to dry at ambient temperature.

Preferably, subsequently, the high-priced component (i) or (ii) is sprayed on in a second treatment step. The composition sprayed onto the surface may additionally be mechanically dispersed. Suitably, with the second step as well, the coating is allowed to dry.

The second treatment step carried out in this way may also be conducted a third time or further times. Thus, advantageously, a coating of the invention is obtained on a porous inorganic substrate.

Moreover, it is expressly pointed out that the content of DE 199 55 047.6, EP 0 960 921 A1, EP 0 846 716 A1, EP 0 846 717 A1, EP 0 716 127 A2, EP 0 716 128 A2 and EP 0 101 816 B1 is regarded as part of the disclosure of the present patent specification.

The present invention accordingly further provides a coating obtained by the present process of the invention.

The present invention further provides for the use of a coating of the invention for the ink, paint, pollutant, bioorganism, oil, water and/or dirt repellency treatment of an absorbent inorganic substrate.

The present invention likewise provides a substrate coated in accordance with the invention.

The coatings of the invention are described in detail below, without restricting the subject matter. Porous substrates, examples being cast stone or paving stones in accordance with DIN 18 501, are of high porosity and thus also exhibit high levels of water absorption. Calculated to the square meter, it is generally possible for up to 800 g of water to be absorbed. A similar amount of impregnating liquid from example 1 of DE 199 55 047.6 would be absorbed, which may prevent commercial use of these very costly products. Markedly lower levels of material consumption may be obtained by carrying out, for example, pre-impregnation with a highly diluted impregnating solution, suitably in accordance with example 1 of DE 199 55 047.6. After drying, the surface proves to be highly hydrophobic, but not yet sufficiently so with regard to anti-graffiti effect. In a subsequent second or further impregnation with an undiluted or less diluted product, from example 1 of DE 199 55 047.6, for example, the amount of product required is generally much less. The second impregnation may take place by brushing in the product onto the hydrophobic mineral surface or, with particular advantage, by spraying the surface with a spray droplet size so small that runoff from the surface is prevented. It is surprising that really small spray droplets in particular adhere to the highly hydrophobic surface. The overall consumption of product is generally much lower than in the case of single impregnation of the porous mineral surface with a concentrate. The coating operation described above may be repeated as often as desired until the target anti-graffiti effect is achieved. A preimpregnation in accordance with the first step, using alkyltrialkoxysilanes, may take place comparably. This achieves the additional advantage, especially on concrete but also with other mineral substrates, such as brick, lime sandstone or various natural stones, for example, that there is a significant reduction in the water absorption, which naturally has a positive effect on the penetration of water-soluble pollutants. Following impregnation with an alkyltrialkoxysilane, the coating operations are suitably effected in the manner described above using a product described in DE 199 55 047.6. It is also possible, however, to use other fluoroalkyl-functional silicon compounds.

Having generally described this invention, a further understanding can be obtained by reference to certain specific examples which are provided herein for purposes of illustration only and are not intended to be limiting unless otherwise specified.

EXAMPLES

VPS 8815 below refers to the product from example 1 of DE 199 55 047.6. This is a co-condensate of aminoethyl aminoethylaminopropyltrimethoxysilane and tridecafluorooctyltriethoxysilane in a molar ratio of 1:3, neutralized with 3 mol of formic acid per mol of aminosilane used, dissolved in water, with full distillative removal of the hydrolysis alcohol, and with an active substance concentration of 15% by weight, based on the fluoroalkyltriethoxysilane used.

Comparative Example A

Impregnation of Cast Stone with VPS 8815 and Assessment of the Anti-Graffiti Properties A dry paving block (in accordance with DIN 18 501, dried at 60° C. for 1 day in a forced air drying cabinet, then stored at room temperature for 1 day in a laboratory) is treated with VPS 8815. For this purpose, VPS 8815 is applied with a brush to the surface of the block until the block absorbs no further impregnating liquid. The consumption of impregnating composition is determined by means of differential weighing (impregnating composition consumption=weight of the block directly after impregnation−weight of the block prior to impregnation). The consumption of impregnating composition is approximately 600 g/m$^2$. Subsequently, the block is stored at room temperature for 2 weeks in the laboratory. The anti-graffiti properties are determined subsequently. For this purpose, a black felt tip (Edding 800 Permanent Marker) is used to draw a line transversely over the block. After a further storage time of one day, an attempt is made to wipe the black line from the surface of the block using an absorbent cloth soaked in ethanol. This attempt is successful, since owing to the impregnating coat the ethanol solvent is absorbed only to a very small extent. Only slight shadow remains.

In the corresponding untreated blocks, or blocks impregnated with impregnating liquids based on alkylalkoxysilanes (e.g., isobutyltriethoxysilane), virtually no success whatsoever in cleaning can be achieved. On the contrary, the black line smudges and the soiled area therefore becomes larger. Cleaning cannot be achieved even by using large amounts of solvent. The fine ink particles are carried by the ethanol into the absorbent, porous substrate and are therefore no longer removable.

Comparative Example B
Impregnation of Cast Stone with Dilute VPS 8815 and Assessment of the Anti-Graffiti Properties A dry paving block (in accordance with DIN 18 501, dried at 60° C. for 1 day in a forced air drying cabinet, then stored at room temperature for 1 day in a laboratory) is treated with dilute VPS 8815 (1 part of VPS 8815 mixed with 14 parts of water). For this purpose, dilute VPS 8815 is applied with a brush to the surface of the block until the block absorbs no further impregnating liquid. The consumption of impregnating composition is determined by means of differential weighing (impregnating composition consumption=weight of the block directly after impregnation−weight of the block prior to impregnation). The consumption of impregnating composition is approximately 600 g/m². Subsequently, the block is stored at room temperature for 2 weeks in the laboratory. The anti-graffiti properties are determined subsequently. For this purpose, a black felttip (Edding 800 Permanent Marker) is used to draw a line transversely over the block. After a further storage time of one day, an attempt is made to wipe the black line from the surface of the block using an absorbent cloth soaked in ethanol. This attempt is successful only to a small extent, since owing to the inadequate impregnating coat the ethanol solvent is absorbed to a considerable extent. A markedly visible shadow remains. The result of cleaning following visual assessment is markedly poorer than the cleaning effect obtained in the case of the block which was treated with the concentrated solution. However, the cleaning result is much better than in the case of untreated blocks or blocks treated with alkyltrialkoxysilane.

Example 1
Two-Fold Impregnation of Cast Stone

A dry paving block (in accordance with DIN 18 501, dried at 60° C. for 1 day in a forced air drying cabinet, then stored at room temperature for 1 day in a laboratory) is treated with dilute VPS 8815 (1 part of VPS 8815 mixed with 14 parts of water). For this purpose, dilute VPS 8815 is applied with a brush to the surface of the block until the block absorbs no further impregnating liquid. The consumption of impregnating composition is determined by means of differential weighing (impregnating composition consumption=weight of the block directly after impregnation−weight of the block prior to impregnation). The consumption of impregnating composition is approximately 600 g/m². Subsequently, the block is stored at room temperature for approximately 2 hours in the laboratory. This is followed by the second coat application. For this purpose, a fine spray mist of VPS 8815 (used undiluted) is deposited on the hydrophobic block surface using a commercial spraying apparatus (Gloria fine sprayer 1 liter, operating overpressure 3 bar, nozzle set for fine spray jet). The droplet size is made so small that the droplets deposited do not roll off (even when the block is stood up vertically). Subsequently, the fine droplets are rubbed on the surface of the block using a soft brush to form a homogeneous film. The amount of impregnating composition absorbed by the block in this process is only approximately 100 g/m². After 2 weeks storage of the block at room temperature, the anti-graffiti properties are determined. For this purpose, a black felttip (Edding 800 Permanent Marker) is used to draw a line transversely over the block. After a further storage time of one day, an attempt is made to wipe the black line from the surface of the block using an absorbent cloth soaked in ethanol. This attempt is completely successful, since the ethanol solvent is not absorbed. No visible shadows remain. The cleaning result following visual assessment is very good and markedly better than the cleaning effect obtained in the case of the block treated with the concentration solution alone. The overall consumption of impregnating composition, based on the VPS 8815 used undiluted, is approximately 140 g/m² and is therefore well below the consumption of impregnating composition in comparative example A yet with an improved anti-graffiti effect.

Example 2.1
Impregnation of Lime Sandstone with Isobutyltriethoxysilane, Determination of the Water Absorption A lime sandstone specimen, (cube with an edge length of approximately 5 cm, test specimen pretreated as described in comparative examples A and B) is immersed in isobutyltriethoxysilane twice for 5 seconds such that the level of the liquid lies approximately 5 cm above the top edge of the test specimen. This process simulates the application of a hydrophobicizing agent by airless spraying, an application method which is established in the art. Following storage of the test specimen in the laboratory (2 weeks, room temperature), the water absorption of the test specimen is determined in comparison to that of a test specimen of equal dimensions, having undergone identical storage but having not been treated with isobutyltriethoxysilane. For this purpose, first of all the weight of the test specimen is measured. Subsequently, the test specimen is stored under water for 24 hours (liquid level 5 cm above the top edge of the test specimen). Subsequently, the weight is measured again. The weight change in percent is found. The water absorption of the untreated test specimen is 10.1%. The water absorption of the test specimen treated with isobutyltriethoxysilane is 0.82%. The reduction in water absorption is therefore more than 90%. From experience, a reduction in water absorption >80% is necessary in order to afford reliable protection against penetrating water. The impregnated stone has no anti-graffiti properties.

Example 2.2
Impregnation of Lime Sandstone with VPS 8815, Determination of the Water Absorption A lime sandstone specimen (cube with an edge length of approximately 5 cm, test specimen pretreated as described in examples 1 to 3) is immersed in VPS 8815 (undiluted solution) twice for 5 seconds such that the level of the liquid lies approximately 5 cm above the top edge of the test specimen. This process simulates the application of a hydrophobicizing agent by airless spraying, an application method which is established in the art. Following storage of the test specimen in the laboratory (2 weeks, room temperature), the water absorption of the test specimen is determined in comparison to that of a test specimen of equal dimensions, having undergone identical storage but having not been treated with isobutyltriethoxysilane. For this purpose, first of all the weight of the test specimen is measured. Subsequently, the test specimen is stored under water for 24 hours (liquid level 5 cm above the top edge of the test specimen). Subsequently, the weight is measured again. The weight change in percent is found. The water absorption of the untreated test specimen is 10.1%. The water absorption of the test specimen treated with VPS 8815 is 5.0%. The reduction in water absorption is therefore about 50%. From experience, a reduction in water absorption >80% is necessary in order to afford reliable protection against penetrating water. The impregnation with VPS 8815 therefore affords no effective protection against water penetration. The anti-graffiti properties correspond to those of example 1.

Example 2.3
Impregnation of Lime Sandstone with Isobutyltriethoxysilane and VPS 8815, Determination of the Water Absorption A lime sandstone specimen (cube with an edge length of approximately 5 cm, test specimen pretreated as described in comparative examples A and B) is immersed in isobutyltriethoxysilane twice for 5 seconds such that the level of the liquid lies approximately 5 cm above the top edge of the test specimen. This process simulates the application of a hydrophobicizing agent by airless spraying, an application method which is established in the art. Following drying of the test specimen in the laboratory (2 hours, room temperature), the immersion process is repeated, except that this time, instead of isobutyltriethoxysilane, undiluted VPS 8815 is used. Subsequently, the test specimen is stored at room temperature for 2 weeks in the laboratory. Thereafter, the water absorption of the test specimen is determined in comparison to that of a test specimen of equal dimensions, having undergone identical storage but having not been treated. For this purpose, first of all the weight of the test specimen is measured. Subsequently, the test specimen is stored under water for 24 hours (liquid level 5 cm above the top edge of the test specimen). Subsequently, the weight is measured again. The weight change in percent is found. The water absorption of the untreated test specimen is 10.1%. The water absorption of the test specimen treated with isobutyltriethoxysilane and VPS 8815 is 0.7%. The reduction in water absorption is therefore significantly more than 90%. From experience, a reduction in water absorption >80% is necessary in order to afford reliable protection against penetrating water. The anti-graffiti properties correspond to those of example 1.

Comparative Example C
Impregnation of Red Maine (Germany) Sandstone with VPS 8815, Assessment of the Anti-Graffiti Properties Red Maine sandstone is cut into slabs measuring 30×30×2 cm, cleaned with water, dried in a forced air drying cabinet at 60° C. for 2 days, and stored in the laboratory at room temperature for 2 weeks. Subsequently, one slab is sprayed (Gloria fine sprayer 1 liter, operating overpressure 3 bar, nozzle set for fine spray jet) with VPS 8815 (undiluted solution). The consumption of impregnating composition is approximately 200 g/m². Subsequently, the treated sandstone slab is stored in the laboratory at room temperature for 2 weeks. The anti-graffiti properties correspond to those of comparative example A.

Example 3
Multiple Impregnation of Red Maine (Germany) Sandstone, Assessment of the Anti-Graffiti Effect Red Main sandstone is cut into slabs measuring 30×30×2 cm, cleaned with water, dried in a forced air drying cabinet at 60° C. for 2 days, and stored in the laboratory at room temperature for 2 weeks. Subsequently, one slab is sprayed (Gloria fine sprayer 1 liter, operating overpressure 3 bar, nozzle set for fine spray jet) with VPS 8815 (diluted solution: 1 part VPS 8815 concentrate+14 parts water). The consumption of impregnating composition is approximately 200 g/m². Following drying of the sandstone slab (room temperature, approximately 2 hours) the second coat is applied. For this purpose, a fine spray mist of VPS 8815 (used undiluted) is deposited on the hydrophobic stone surface using a commercial spraying apparatus (Gloria fine sprayer 1 liter, operating overpressure 3 bar, nozzle set for fine spray jet). The droplet size is made so small that the deposited droplets do not roll off (even when the stone is stood up vertically). Subsequently, the fine droplets are rubbed with a soft brush on the surface of the stone to form a homogeneous film. The amount of impregnating composition absorbed by the stone during this process is only approximately 40 g/m². This operation is repeated. During the application of the third coat, however, the consumption of impregnating composition is only approximately 20 g/m². Following storage of the stone at room temperature for 2 weeks, the anti-graffiti properties are determined. They correspond to those of example 1. With a reduced overall consumption, anti-graffiti properties improved over the single impregnation are obtained.

Obviously, numerous modifications and variations of the present invention are possible in light of the above teachings. It is therefore to be understood that within the scope of the appended claims, the invention may be practiced otherwise than as specifically described herein.

This application is based on German patent application 10049153.7 filed in the German Patent Office on Sep. 27, 2000 the entire contents of which are hereby incorporated by reference.

What is claimed is:

1. A process for producing a coating on a substrate, comprising:

A) applying to a substrate in a first step a composition comprising one or more organosilicon components selected from the group consisting of
   (i) at least one organosiloxane which carries at least one triamino group of the general formula I

   $$\{NH_x(CH_2)_aNH_y(CH_2)_bNH_z\}- \qquad (I),$$

such a group being attached by way of at least one N-bonded alkylene group having 1 to 4 carbon atoms to at least one silicon atom, a and b being identical or different and representing an integer from 1 to 6, x being 0 or 1 or 2, y being 0 or 1, z being 0 or 1 or 2, subject to the proviso that $(x+y+z) \leq 4$,
   at least one Si—C-bonded fluoroalkyl group of the general formula II

   $$F_3C(CF_2)_r(CH_2)_s- \qquad (II)$$

in which r is an integer from 0 to 18 and s is 0 or 2, and at least one hydroxyl and/or alkoxy group,
   (ii) a composition which comprises (i),
   (iii) an alkylalkoxysilane in which alkyl represents linear, branched or cyclic alkyl radicals having 1 to 16 carbon atoms and alkoxy represents methoxy or ethoxy or propoxy or butoxy,
   (iv) a composition which comprises at least one organosiloxane which carries at least one amino group of the general formula III

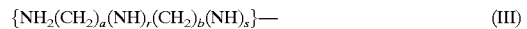
   $$\{NH_2(CH_2)_a(NH)_r(CH_2)_b(NH)_s\}- \qquad (III)$$

this group being attached by way of at least one N-bonded alkylene group having 1 to 4 carbon atoms to at least one silicon atom, a and b being identical or different and being an integer from 0 to 6, r being 0 or 1, s being 0 or 1, subject to the proviso that when a=0 then r=0 and when b=0 then s=0, at least one Si—C-bonded linear, branched or cyclic alkyl group having 1 to 16 carbon atoms, and at least one hydroxyl and/or alkoxy group; and (v) a mixture thereof, to obtain a treated substrate, and B) subsequently in a second step applying (i) or (ii) to the treated substrate.

2. The process of claim 1, wherein a concentration of the organosilicon components (i) to (iv) is from 0.01 to 100% by weight.

3. The process of claim 1, wherein the organosilicon components (i) to (iv) are used in an aqueous and/or alcoholic formulation or in an emulsion.

4. The process of claim 1, wherein in the first step the components (i) to (iv) are used in diluted form.

5. The process of claim 1, wherein in the second step a concentration of the organosilicon components (i) or (ii) is from 1 to 50% by weight.

6. The process of claim 1, wherein (iii) is selected from the group consisting of methyltrimethoxysilane, dimethyldimethoxysilane, methyltriethoxysilane, dimethyldiethoxysilane, i-propyltrimethoxysilane, i-propyltriethoxysilane, n-propyltrimethoxysilane, n-propyltriethoxysilane, i-butyltrimethoxysilane, i-butyltriethoxysilane, n-butyltrimethoxysilane, n-butyltriethoxysilane, i-octyltrimethoxysilane, i-octyltriethoxysilane, n-octyltrimethoxysilane, n-octyltriethoxysilane, hexadecyltrimethoxysilane and hexadecyltriethoxysilane.

7. The process of claim 1, wherein A) is (i) or (ii) in which the molar ratio of the groups according to the formulae I and II is $1:\leq 3.5$.

8. The process of claim 1, wherein A) is (i) or (ii) and wherein (i) or (ii) have been prepared by a process comprising cocondensation of an aminoethylaminoethylaminopropyltrialkoxysilane and tridecafluorooctyltrialkoxysilane, alkoxy representing methoxy and representing ethoxy.

9. The process of claim 1, wherein (i) to (iv) in the first step, second step, or both steps are applied to the substrate by spraying, brushing, rolling, dipping, knife coating, polishing, or flow coating.

10. The process of claim 1, wherein the substrate is a porous mineral building material.

11. The process of claim 10, wherein the porous mineral building material comprises concrete, lime sandstone, brick, mineral plaster, or natural stone.

12. The process of claim 1, wherein the substrate is a porous mineral building material comprising a paint coating.

13. The process of claim 1, further comprising applying (i) or (ii) one or more times in a third step.

14. A method of making an absorbent inorganic substrate repellant for ink, paint, pollutant, bioorganism, oil, water and/or dirt comprising treating said absorbent inorganic subsrate according to the process of claim 1.

15. A coated substrate prepared by the process of claim 1.

* * * * *